United States Patent [19]

Wada

[11] 4,447,884
[45] May 8, 1984

[54] GRAPHIC DISPLAY IN AN ELECTRONIC THERMOMETER

[75] Inventor: Yoshihiro Wada, Ikoma, Japan

[73] Assignee: Sharp Kabushiki Kaisha, Osaka, Japan

[21] Appl. No.: 334,363

[22] Filed: Dec. 24, 1981

[30] Foreign Application Priority Data

Dec. 27, 1980 [JP] Japan ................................ 55-185250

[51] Int. Cl.³ ........................ G01K 1/08; G01K 7/20
[52] U.S. Cl. .............................. 364/557; 346/33 TP;
374/102; 374/108; 374/170; 374/183
[58] Field of Search .............. 374/159, 162, 163, 183,
374/185, 170, 101; 340/711, 715, 765, 753, 754,
799; 364/557; 346/33 TP

[56] References Cited

U.S. PATENT DOCUMENTS

| | | | |
|---|---|---|---|
| 3,667,039 | 5/1972 | Garfein et al. | 340/753 X |
| 3,774,195 | 11/1973 | Schulthess et al. | 340/753 |
| 3,911,424 | 10/1975 | Giannuzzi et al. | 340/799 X |
| 3,922,535 | 11/1975 | Randolph | 364/557 X |
| 3,947,722 | 3/1976 | Strom et al. | 340/753 X |
| 4,158,965 | 6/1979 | Prosky | 374/114 |
| 4,161,880 | 7/1979 | Prosky | 364/557 X |
| 4,279,152 | 7/1981 | Crossland | 374/162 |
| 4,340,887 | 7/1982 | Dias | 340/711 |
| 4,370,070 | 1/1983 | Leroux | 374/170 |
| 4,371,271 | 2/1983 | Bellet | 374/163 X |

FOREIGN PATENT DOCUMENTS 2045480 10/1980 United Kingdom ............... 364/557

*Primary Examiner*—Daniel M. Yasich
*Attorney, Agent, or Firm*—Birch, Stewart, Kolasch and Birch

[57] ABSTRACT

An electronic thermometer includes a memory system for storing the body temperature data measured by a temperature sensing element. The memory system has ten memory sections for storing the temperature data of each of last ten days. A graphic display system is associated with the memory system for displaying the temperature data stored in the memory system in a bar graph fashion, thereby indicating the temperature variation of these ten days.

5 Claims, 20 Drawing Figures

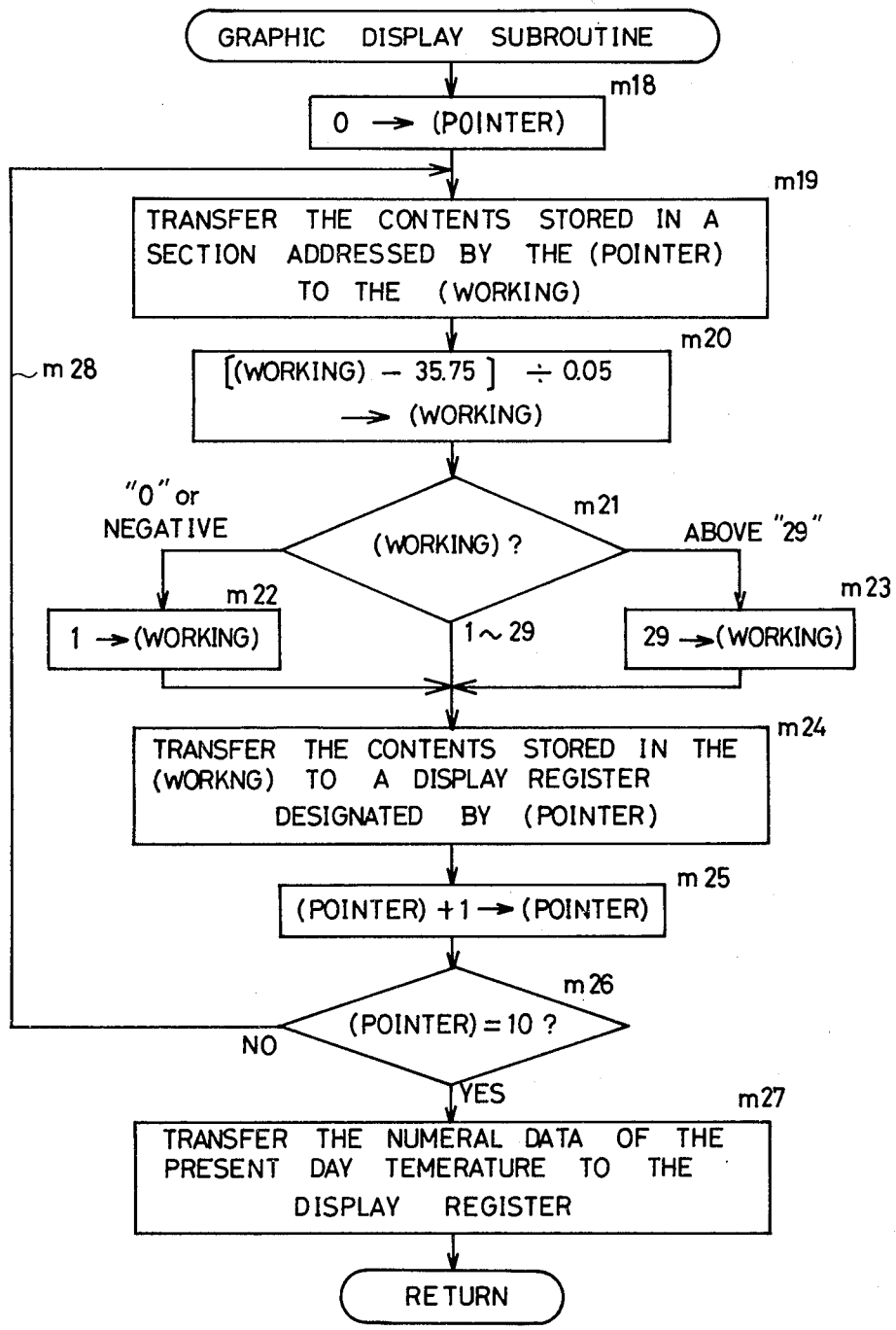
FIG. 6 (GRAPHIC DISPLAY SUBROUTINE)

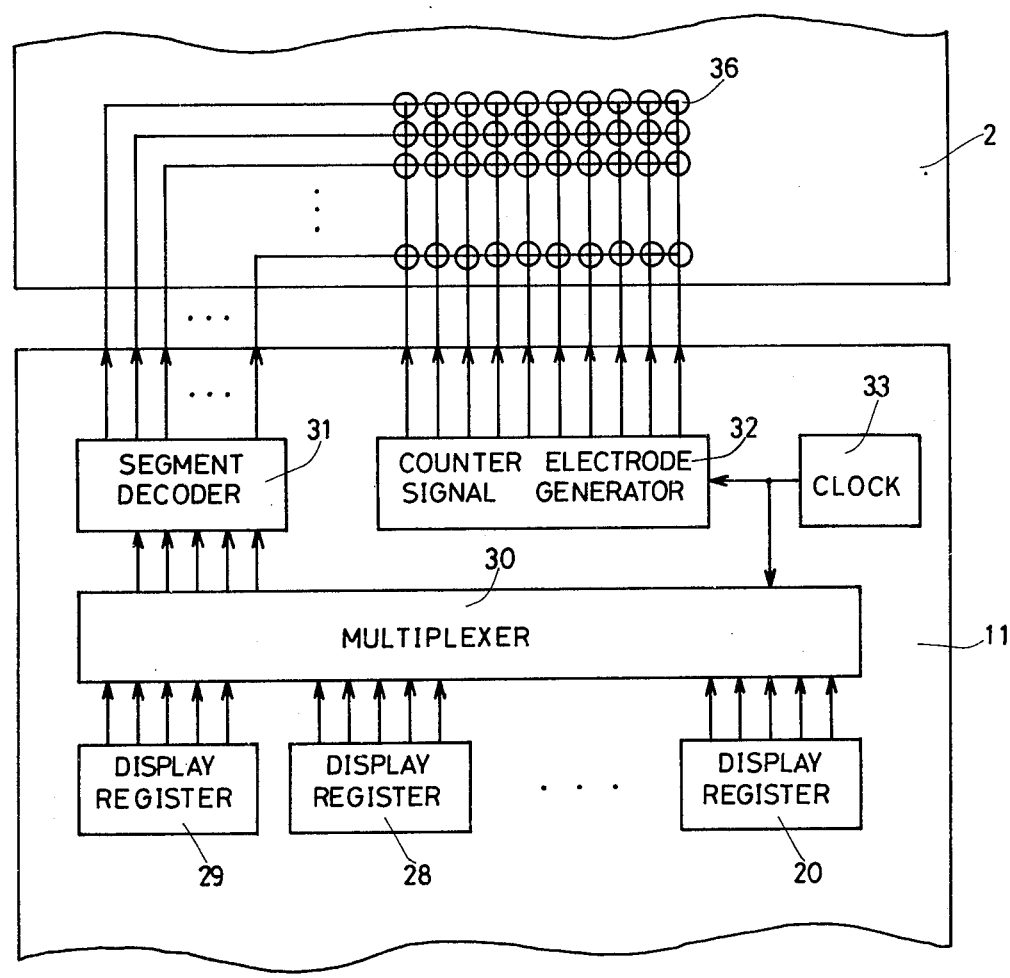
FIG. 7 (DISPLAY CONTROL)

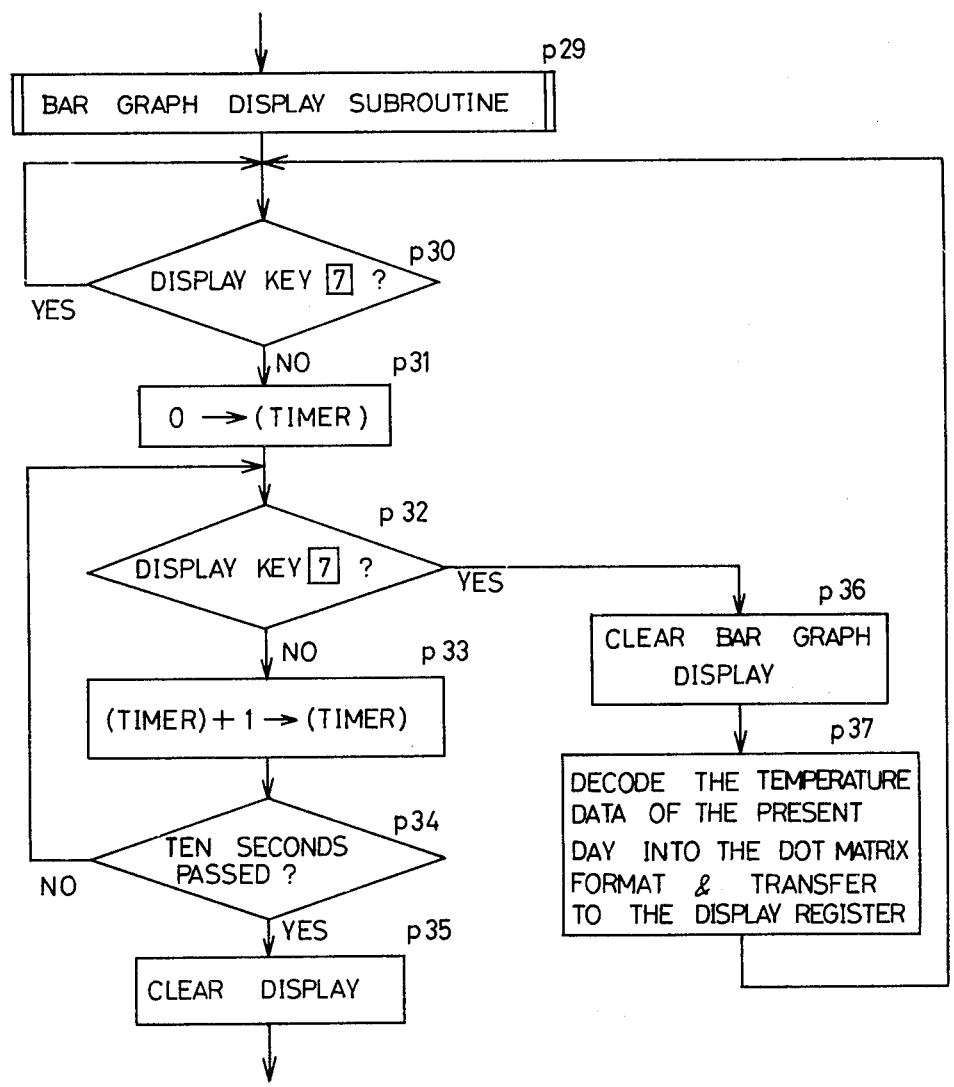
FIG.8 (DOT MATRIX DISPLAY SUBROUTINE)

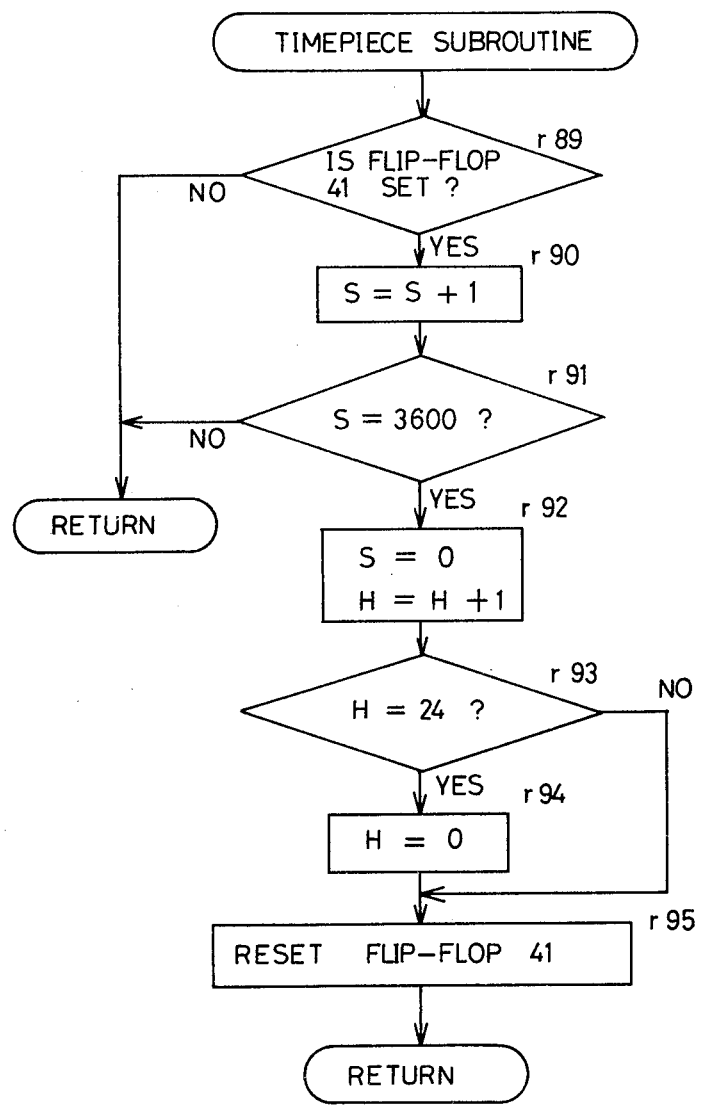
FIG.10 (TIMEPIECE SUBROUTINE)

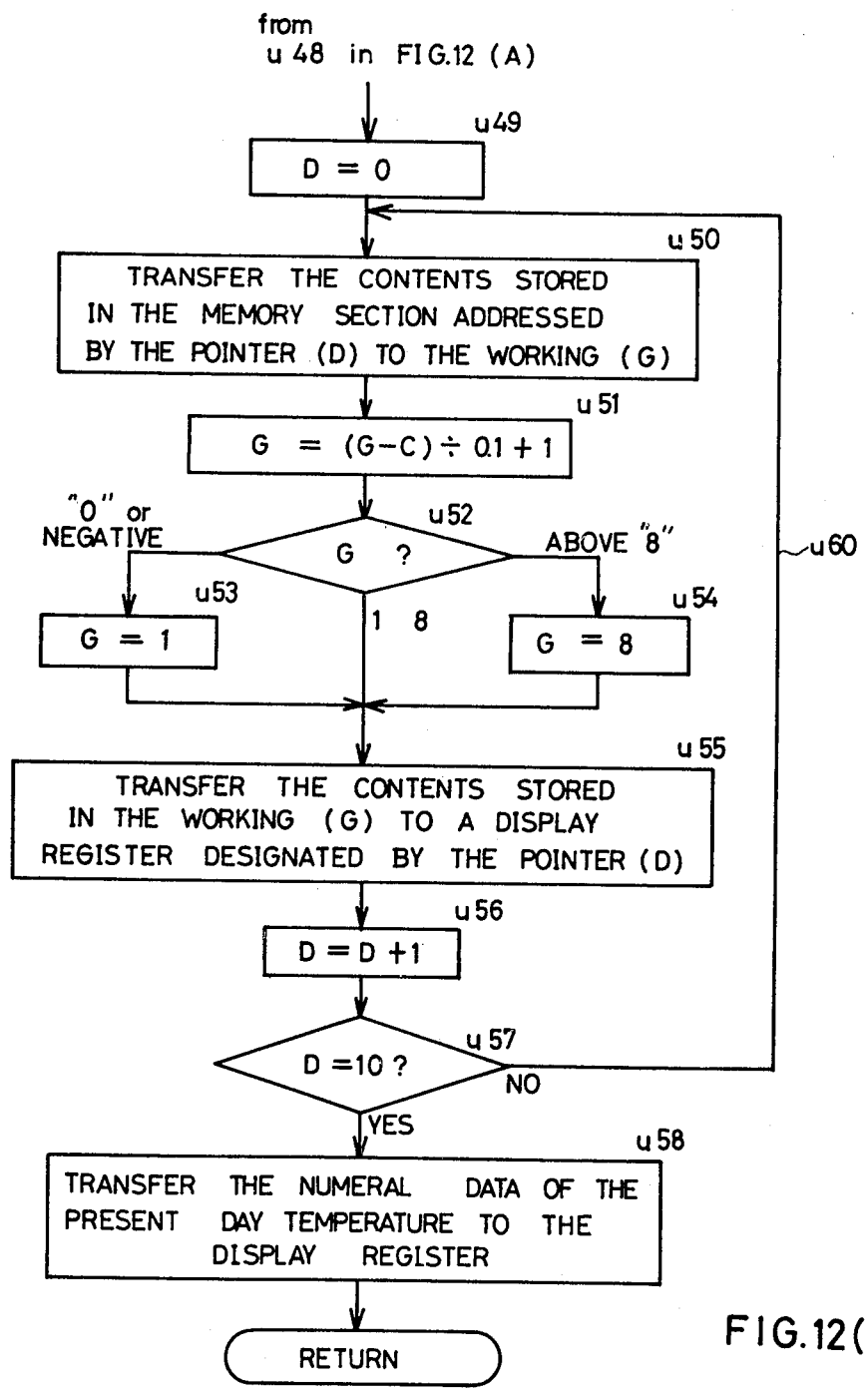

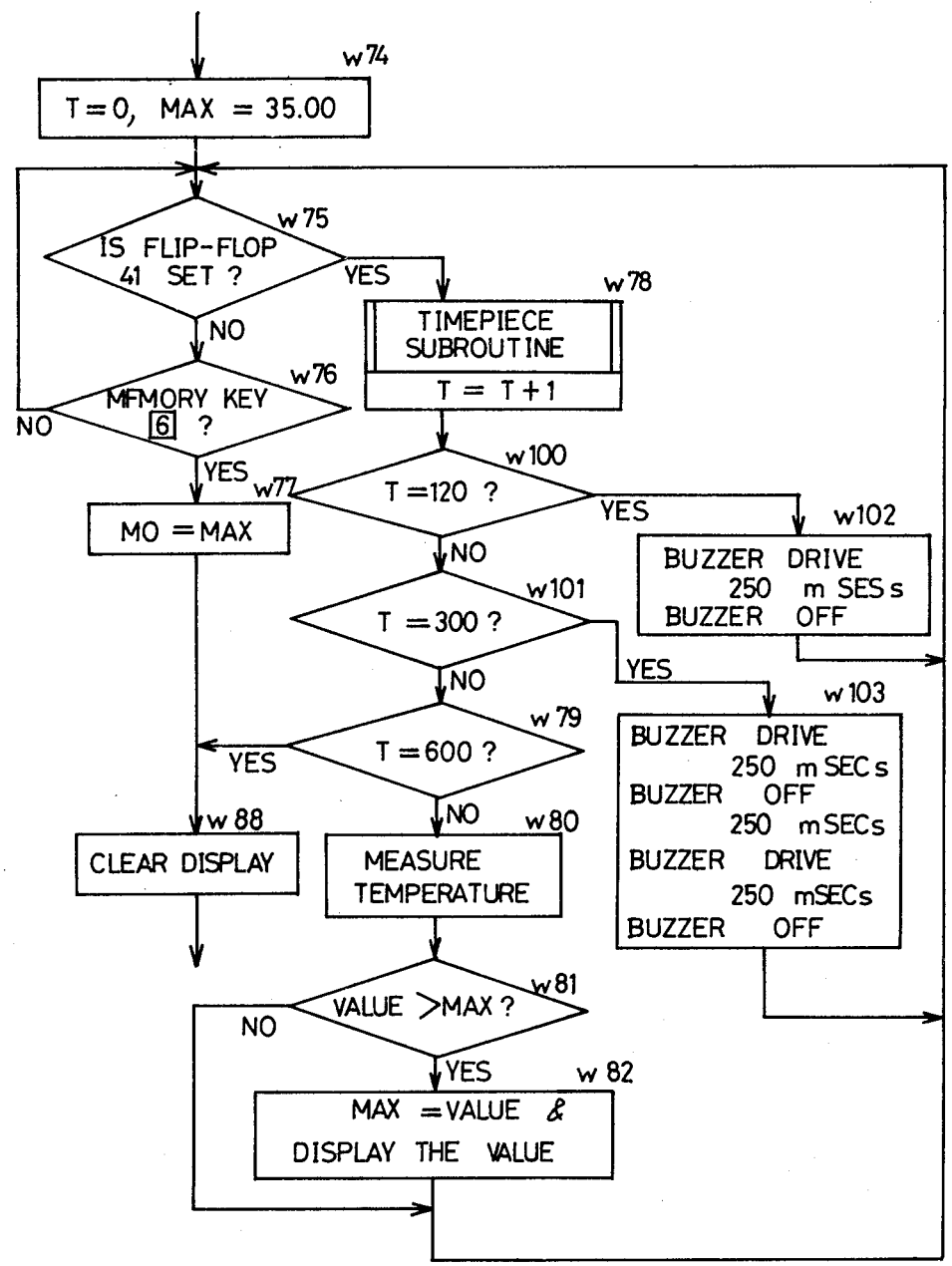
FIG.13 (BUZZER DRIVE)

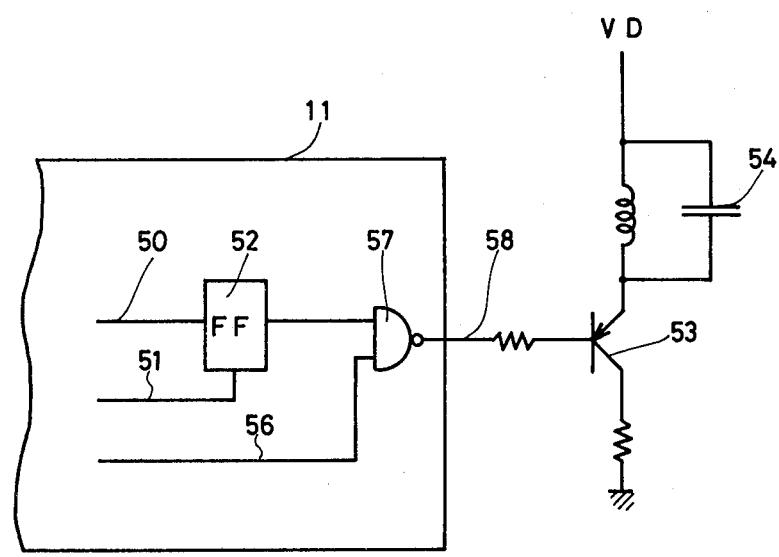
FIG.14(BUZZER DRIVE)

GRAPHIC DISPLAY IN AN ELECTRONIC THERMOMETER

BACKGROUND AND SUMMARY OF THE INVENTION

The present invention relates to an electronic thermometer and, more particularly, to a graphic display system in an electronic woman thermometer.

The basal body temperature information is widely used to check an abnormal condition of the physiology and to find out the conceiving period or the sterile period in a menstruation cycle. A mercury clinical thermometer or an electronic thermometer is used to measure the basal body temperature. The measured temperature data should be depicted onto a section graphic paper to obtain the temperature variation curve. This operation is troublesome.

An example of an electronic woman thermometer is disclosed in British Patent Publication No. 2,045,480A, "ELECTRONIC WOMAN THERMOMETER" published on October 29, 1980.

In the thermometer disclosed in GB 2,045,480A, the temperature detection and the determination as to whether the present day belongs to the conceiving period or the sterile period are automatically conducted. However, the above-mentioned temperature variation curve is not automatically obtained.

Accordingly, an object of the present invention is to provide a novel graphic display system in an electronic thermometer.

Another object of the present invention is to provide an electronic woman thermometer which has a graphic display system for displaying the basal body temperature variation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a memory system is included in an electronic thermometer for storing the basal body temperature data of the last ten (10) days. A graphic display system is associated with the memory system for displaying the basal body temperature variation of these ten (10) days in a bar-graph fashion. In a preferred form, the graphic display system includes a liquid crystal display panel which has ten (10) rows of alined bar segments for displaying the basal body temperature of each day.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 6 is a flow chart for explaining a subroutine which controls the graphic display;

FIG. 7 is a block diagram of an essential part of the electronic thermometer of FIG. 2;

FIG. 8 is a flow chart for explaining another embodiment of the electronic thermometer of the present invention;

FIGS. 9, 9A, 9B, 9C and 9D together are a flow chart for explaining still another embodiment of the electronic thermometer of the present invention;

FIG. 10 is a flow chart for explaining a subroutine included in the flow chart of FIG. 9;

FIGS. 12, 12A and 12B together are a flow chart for explaining yet another embodiment of the electronic thermometer of the present invention;

FIG. 13 is a flow chart for explaining a further embodiment of the electronic thermometer of the present invention; and FIG. 14 is a schematic block diagram of an essential part of the electronic thermometer of the embodiment of FIG. 13.

DESCRIPTION OF THE PREFERRED EMBODIMENTS

Figure 1:
FIG. 1 is a graph showing a typical basal body temperature variation.

FIG. 1 shows a typical variation curve of the basal body temperature. The present invention is to provide an electronic thermometer which automatically depicts such a graph.

Figure 2:
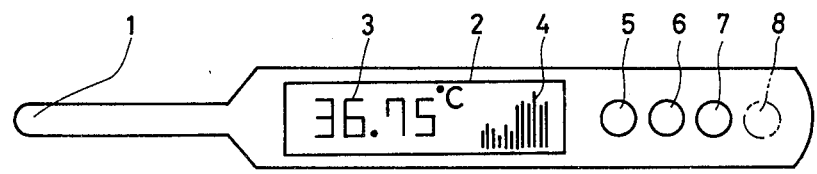
FIG. 2 is a plan view of an embodiment of an electronic thermometer of the present invention.

FIG. 2 shows an embodiment of the electronic thermometer of the present invention. The electronic thermometer of the present invention includes a temperature sensing element 1, such as a thermistor, disposed at the tip end of a sensor probe. The temperature sensing element 1 functions to detect the body temperature when the sensor probe is disposed beneath the tongue or under the armpit. A liquid crystal display panel 2 is provided for displaying the measured temperature value. More specifically, the liquid crystal display panel 2 includes a numeral display section 3 which displays the measured temperature value, and a graphic display section 4 which displays the bar graph for depicting the basal body temperature variation. The electronic thermometer of the present invention further includes a measurement start key 5 for instructing the initiation of the temperature measuring operation, a memory key 6 for controlling a memorizing operation of the measured temperature, and a display key 7 for controlling a display operation of the memorized basal body temperature information.

Figure 3:
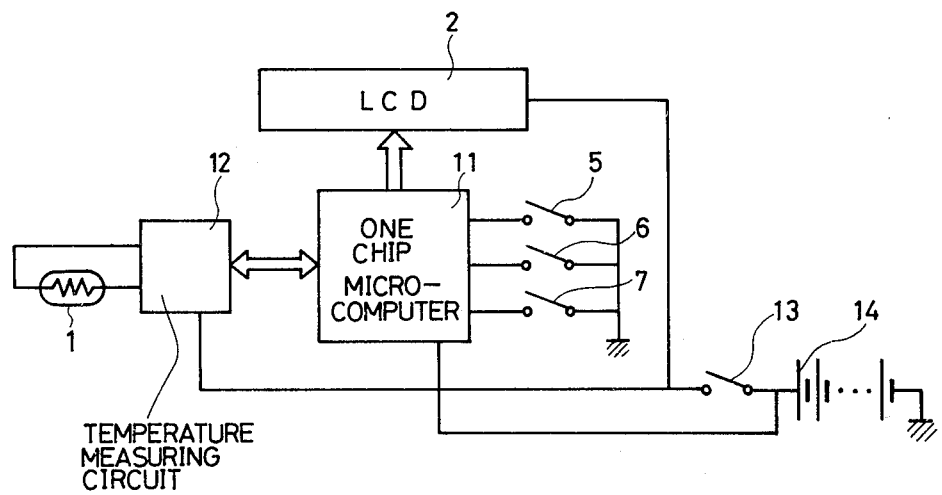
FIG. 3 is a schematic block diagram of the electronic thermometer of FIG. 2.

FIG. 3 schematically shows a control system of the electronic thermometer of FIG. 2. When the measurement start key 5 is actuated, a one chip microcomputer 11 functions to enable a temperature measuring circuit 12. The resistance value of the temperature sensing element 1 varies depending on the ambience temperature. The temperature measuring circuit 12 functions to convert the variation of the resistance value of the temperature sensing element 1 into variations of a voltage level or signal frequency. The one chip microcomputer 11 functions to read out an output signal derived from the temperature measuring circuit 12 through the use of the analog-to-digital conversion, the frequency counting or the pulse width detection method. The thus read out data is treated in the one chip microcomputer 11 in order to obtain an electric signal representing the body temperature in accordance with a predetermined calculation formula. The measured body temperature is displayed at the liquid crystal display panel 2. More specifically, the liquid crystal display panel 2 displays the highest value of the detected body temperature. The body temperature measuring operation is automatically terminated when a predetermined period of time, for example, 10 minutes has passed from the actuation of the measurement start key 5. If the memory key 6 is actuated during the measuring period, the temperature data now displayed on the liquid crystal display panel 2 is memorized into a memory system, and the measuring operation is terminated. In case the memory key 6 is not actuated within the measuring period, 10 minutes, the measured temperature is not memorized, and the system is returned to the initial state wherein the displayed data disappears.

The one chip microcomputer 11 is continuously supplied with power from a battery cell 14 in order to maintain the memorized temperature data. The one chip microcomputer 11 preferably comprises a CMOS LSI which shows a considerably low power dissipation. In such a case, a silver oxide cell or a conventional dry cell ensures the memory storage more than one year. Further, the temperature measuring circuit 12 can be incorporated into the one chip microcomputer 11.

Figure 4:
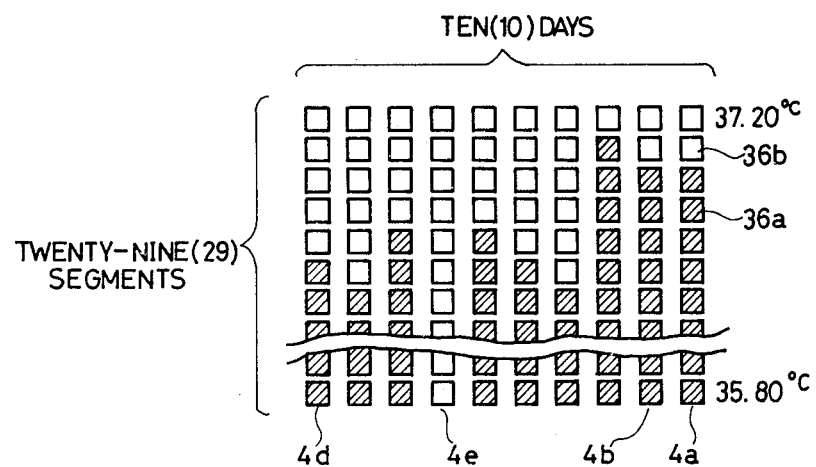
FIG. 4 is a plan view showing a graphic display panel included in the electronic thermometer of FIG. 2.

When the display key 7 is actuated, the memorized temperature data is displayed at the graphic display section 4 of the liquid crystal display panel 2 in the bar graph fashion as shown in FIG. 4. FIG. 4 shows a display condition wherein the body temperature of ten (10) days is displayed. Each column indicates the body temperature of one day within a range from 35.80° C. to 37.20° C. with the interval of 0.05° C. That is, each column has twenty-nine (29) segments. Normally, the basal body temperature belongs to a range between 35.80° C. and 37.20° C. If this range is divided by 0.05° C., twenty-nine (29) segments are required to display the temperature data of one day. Thus, 290 segments are provided for displaying the ten (10) day variation. In FIG. 4, one column corresponds to one day basal body temperature. A column 4a indicates the basal body temperature of the present day. A column 4b displays the basal body temperature of yesterday. A column 4d displays the basal body temperature of nine (9) days ago. A column 4e is assigned to show the basal body temperature of six (6) days ago. In this example, the basal body temperature measurement has not been conducted six (6) days ago. Thus, none of the segments in the column 4e are activated. The hatched segments 36a show the activated condition, and the solid segments 36b show the nonactivated condition.

Figure 5:
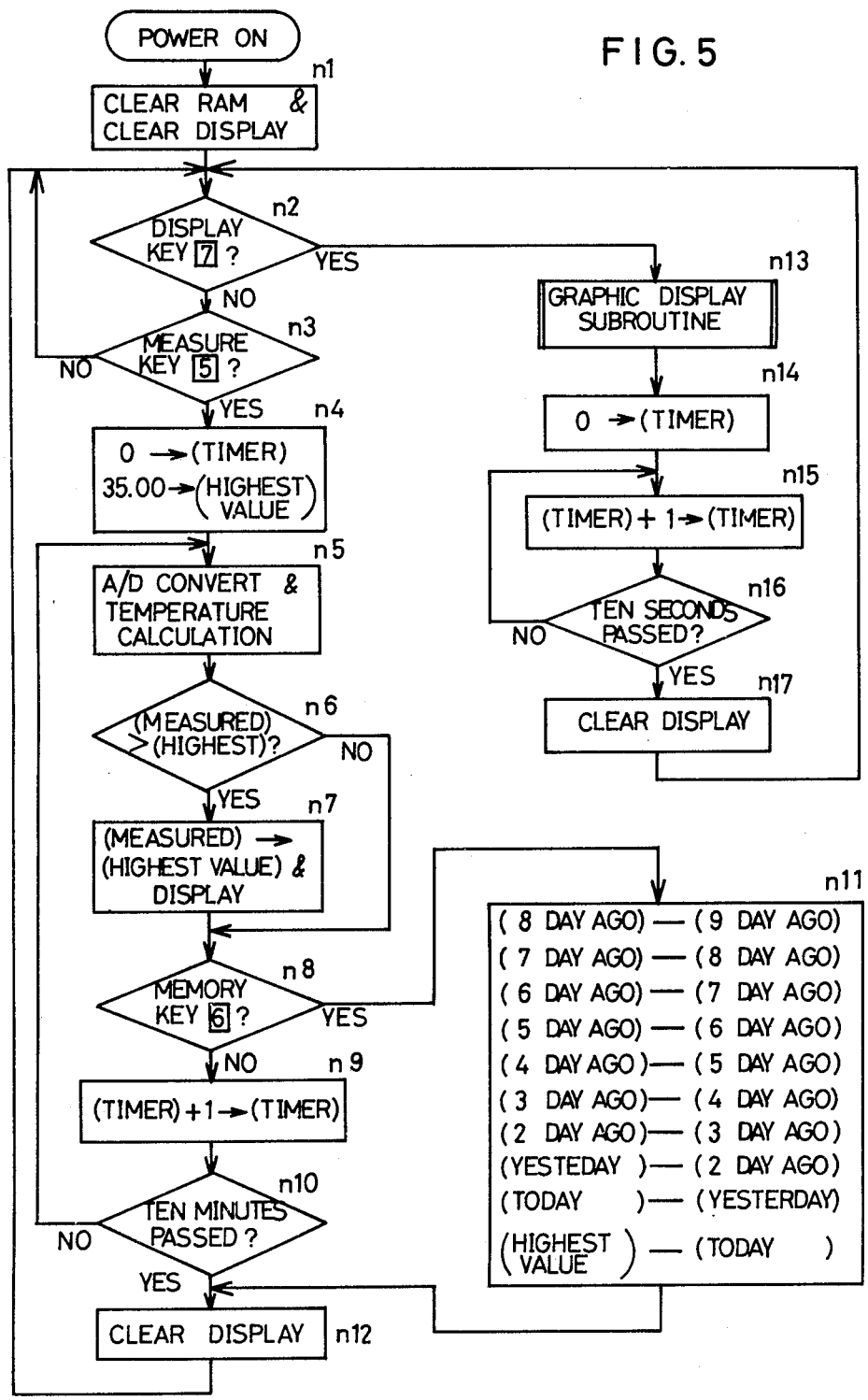
FIG. 5 is a flow chart for explaining an operation mode of the electronic thermometer of FIG. 3.
Figure 9A:
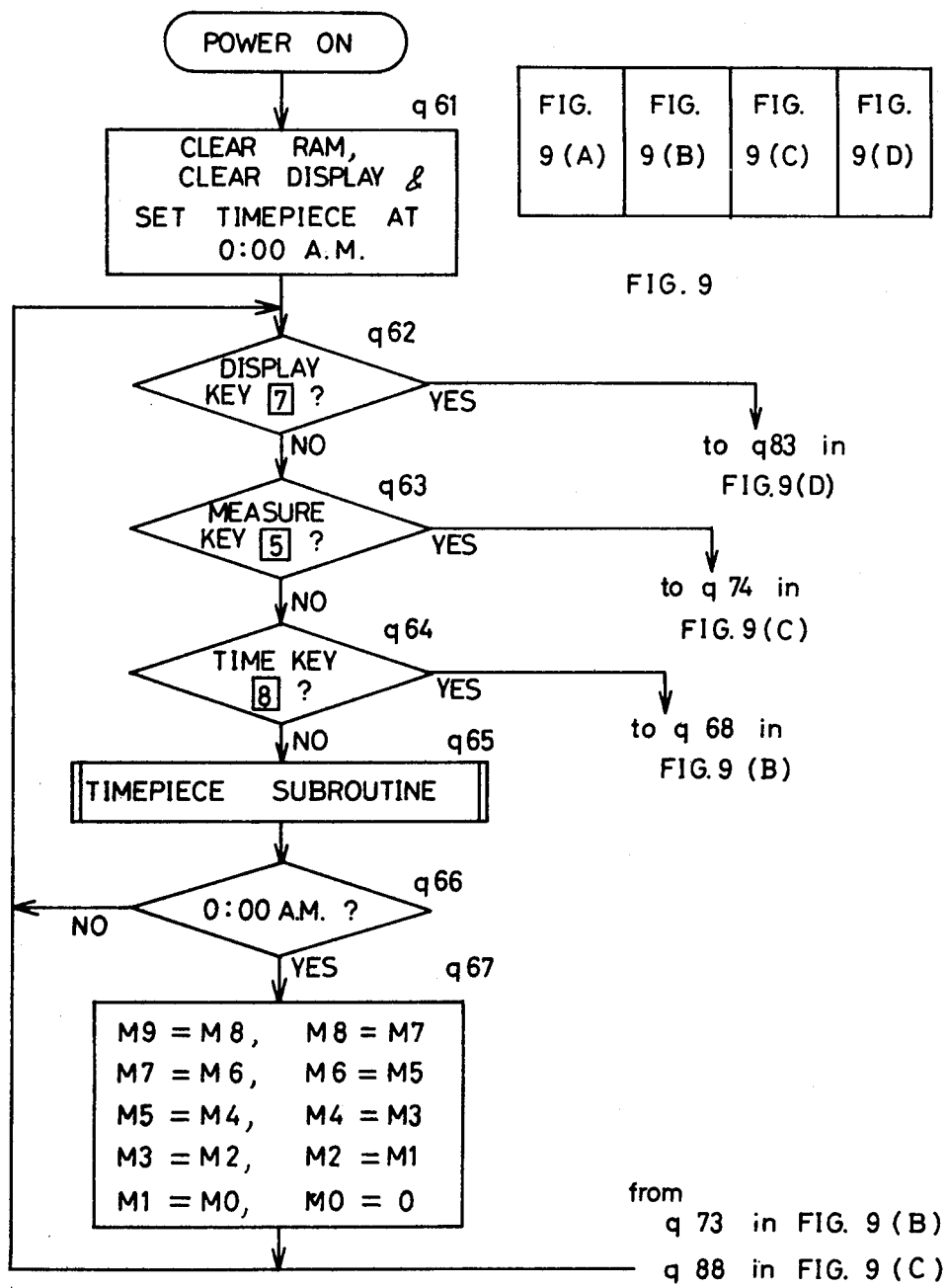
Figure 9B:
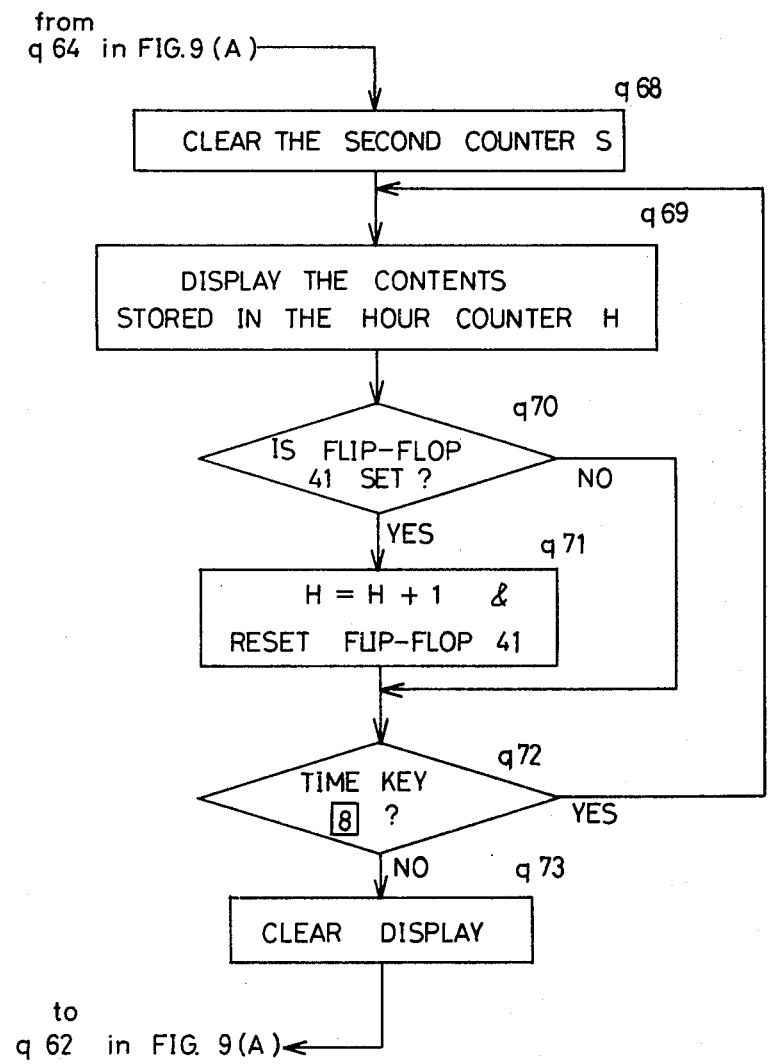
Figure 9C:
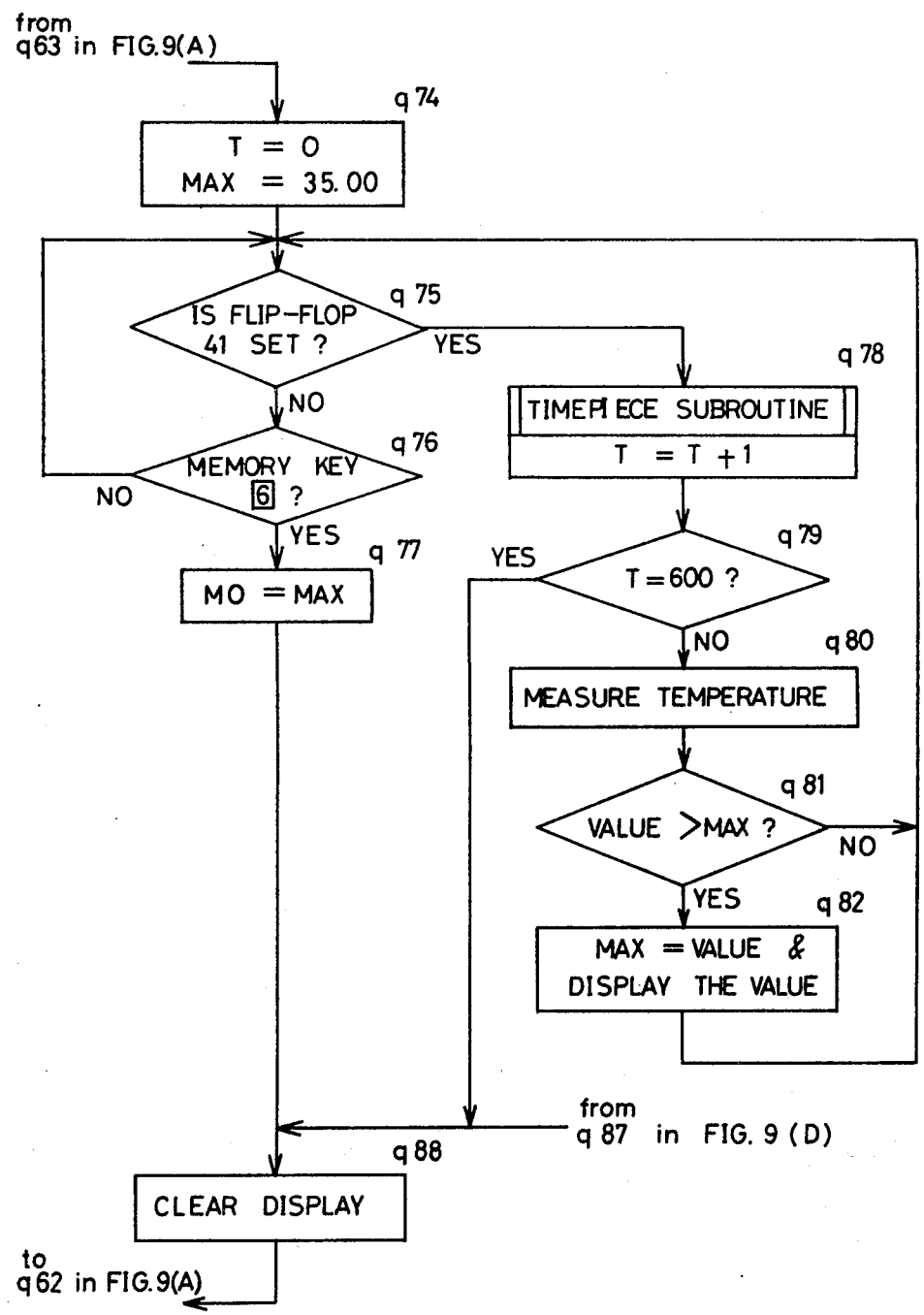
Figure 9D:
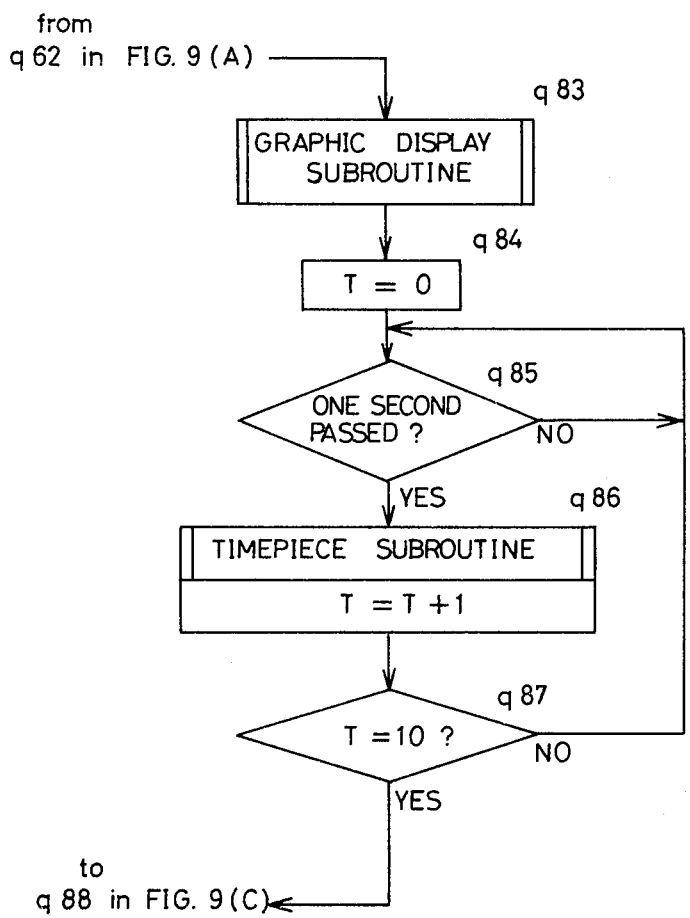

FIG. 5 shows a flow chart for conducting the above-mentioned operation. When a main power switch 13 of the battery cell 14 is switched on, a random access memory (RAM) included in the one chip microcomputer 11 is cleared. The display condition on the liquid crystal display panel 2 is cleared, and the temperature measuring circuit 12 is placed in the initial condition. These operations are performed at a step n1 shown in FIG. 5. At the following steps n2 and n3, the actuation of display key 7 and the measurement start key 5 is detected, respectively. When the measurement start key 5 is actuated, the program is advanced to the following step n4 at which a timer is reset to "zero", the timer functioning to count a time period during which the temperature measuring operation is conducted. At the step n4, contents stored in a random access memory, which functions to store the highest value of the now measured body temperature, are forced to become "35.00". The above-mentioned timer and the random access memory are included in the one chip microcomputer 11. The temperature measuring circuit 12 is enabled to initiate the actual measuring operation at a step n5. At the step n5, the analog-to-digital converting operation is conducted to obtain a detection value, and the thus obtained detection value is treated in accordance with a predetermined calculation formula in order to obtain a signal representing the body temperature. At the following step n6, the now detected body temperature is compared with the highest value stored in the random access memory. If the now detected body temperature is higher than the highest value stored in the random access memory, the now detected body temperature is introduced into the random access memory as the highest value, at the following step n7. The body temperature less than 35.00° C. will not be introduced into the random access memory because the contents in the random access memory is initially set to "35.00".

A step n8 is provided for detecting the actuation of the memory key 6. If the memory key 6 is not actuated, the program is advanced to the following step n9 at which the contents stored in the timer for counting the measuring time period are increased by "one". The determination as to whether ten (10) minutes have passed from the initiation of the temperature measuring operation is conducted through the use of the contents stored in the above-mentioned timer. Since a time period required for one cycle of the program is a fixed value, the ten (10) minute period can be accurately detected when the contents stored in the timer reach a preselected value. A step n10 detects whether ten (10) minutes have passed from the initiation of the temperature measuring operation. In case ten (10) minutes have not yet passed, the measuring operation is continued. If ten (10) minutes have passed, the program is advanced to a step n12 at which the display on the liquid crystal display panel 2 is cleared and, then, the program is returned to the subroutine including the steps n2 and n3 for detecting the actuation of the display key 7 and the measurement start key 5, respectively.

Generally, the temperature measuring operation is completed within three (3) to five (5) minutes. When the measuring operation is completed, the electronic thermometer is taken out from the mouth or the armpit to read the measured temperature displayed at the liquid crystal display panel 2. The display on the liquid crystal display panel 2 automatically disappears when ten (10) minutes have passed from the initiation of the measuring operation.

When the memory key 6 is actuated during the measuring period (within 10 minutes from the initiation of the measuring operation), the measuring operation is interrupted at the condition, and the program is advanced from the step n8 to a step n11. At the step n11, the highest temperature value stored in the random access memory is memorized in the random access memory as the basal body temperature of the present day. The memorizing operation in the random access memory is conducted in the following manner. First, the contents stored in an address which stores the temperature data of eight (8) days ago are transferred to a memory section for storing the temperature data of nine (9) days ago. The temperature data previously stored in the memory section for nine (9) days ago data is lost. The contents stored in the memory section for seven (7) days ago are transferred to the memory section for eight (8) days ago. In this way, the temperature data is sequentially shifted to empty the memory section for storing the basal body temperature of the present day. Then, the highest body temperature data now measured is introduced into the memory section of the present day.

The address assignment in the random access memory is shown in the following TABLE I.

TABLE I

| RAM address | RAM contents |
| --- | --- |
| M0 | temperature data of today |
| M1 | temperature data of yesterday |
| M2 | temperature data of two days ago |
| M3 | temperature data of three days ago |
| M4 | temperature data of four days ago |
| M5 | temperature data of five days ago |
| M6 | temperature data of six days ago |
| M7 | temperature data of seven days ago |
| M8 | temperature data of eight days ago |
| M9 | temperature data of nine days ago |
| M10 | pointer |
| M11 | working |

When the actuation of the display key 7 is detected at the step n2, the program is advanced to a graphic display subroutine n13, wherein the ten day data is graphically displayed at the graphic display section 4 of the liquid crystal display panel 2 and the temperature value of the present day is displayed at the numeral display section 3 of the liquid crystal display panel 2. The graphic display is conducted for ten (10) seconds after actuation of the display key 7. Then, the graphic display is automatically cleared. The ten second calculation is conducted by steps n14, n15 and n16. The clearing operation of the graphic display is conducted at a step n17.

FIG. 6 shows the graphic display subroutine n13, in detail. In the graphic display subroutine n13, the pointer is first cleared at a step m18. The pointer is used to address a desired memory section in the random access memory. The contents stored in the pointer are increased by one at a step m25, whereby the memory sections M0 through M9 are progressively addressed. The temperature data stored in the memory section addressed by the pointer is transferred to the working area at a step m19. At the following step m20, the temperature data x temporarily stored in the working area is treated in accordance with the following formula.

$$x = (x - 35.75) \div 0.05 \tag{1}$$

This calculation is to convert the temperature data into a digital value "1" when the temperature data is 35.80° C. The temperature data 35.85° C. is converted into a digital value "2". In a same manner, the temperature data 37.20° C. is converted into a digital value "29". The following step m21 is to classify the converted digital value into three groups. When the digital value is negative or zero, that is, when the temperature data is less than or equal to 35.75° C., a digital value "1" is assigned at a step m22. When the digital value is greater than or equal to "30", a digital value "29" is assigned at a step m23. Then, the program is advanced to the following step m24. The above-mentioned classification is conducted in order to display the temperature as 35.80° C. if the temperature data is less than or equal to 35.75° C., and to display the temperature as 37.20° C. if the temperature data is greater than 37.20° C.

Although it will be described, in detail, later, ten (10) display registers are provided for each digital value of ten (10) days. The digital value stored in the working area is transferred to the display registers in accordance with the contents stored in the pointer. More specifically, when the contents stored in the pointer are "0", the digital value is transferred to and stored in the display register assigned to the temperature of today. When the contents stored in the pointer are "9", the digital value is transferred into and stored in the display register assigned to the temperature of nine (9) days ago. These display registers are designated as 20 through 29 in FIG. 7 which will be described later. When the transfer of one digital value is completed, the contents stored in the pointer are increased by one (1) at the step m25. The following step m26 functions to determine whether the contents stored in the pointer reach ten (10). The program is looped along a feedback path m28 until the contents stored in the pointer reach ten (10), at which the transfer of the digital value is completed. The following step m27 is to conduct the display of the temperature value of the present day at the numeral display section 3 of the liquid crystal display panel 2. A seven segment selection signal corresponding to the present day temperature data is transferred to the display register for the numeral display and, then, the program is returned to the mainroutine. The control related to the segment numeral display is well known in the art.

FIG. 7 shows a display control system included in the one chip microcomputer 11. The one chip microcomputer 11 includes the above-mentioned display registers 20 through 29. The display register 20 is provided for storing the digital value related to the body temperature of the present day. Similarly, the display register 29 is provided for storing the digital value related to the body temperature of nine (9) days ago. Each of the display registers 20 through 29 comprises a five bit register for storing the digital values "0" through "31" related to the body temperature in the binary notation. Output signals derived from the display registers 20 through 29 are applied to a multiplexer 30 which functions to apply the output signal from any one of the display registers 20 through 29 to a segment decoder 31. A display clock generator 33 develops a clock pulse for controlling the duty drive. The clock signal derived from the display clock generator 33 is applied to the multiplexer 30 and a counter electrode signal generator 32. The counter electrode signal generator 32 develops a counter electrode drive signal of the duty 1/10, which is applied to the counter electrodes included in the liquid crystal display panel 2.

The segment decoder 31 develops bit output signals to the twenty-nine (29) segment electrodes included in the liquid crystal display panel 2 in response to the five (5) bit input signal applied thereto, thereby displaying the body temperature in the bar graph fashion. The decode format is shown in the following TABLE II.

In FIG. 7, each circle 36 represents the segment electrode for conducting the bar graph display, which corresponds to the segment in FIG. 4. The rightmost column in FIGS. 4 and 7 indicates the basal body temperature of today. The leftmost column displays the basal body temperature of nine (9) days ago. The ten (10) counter electrode drive signals derived from the counter electrode signal generator 32 are applied to each of ten (10) counter electrodes included in the liquid crystal display panel 2. The twenty-nine (29) segement selection signals derived from the segment decoder 31 are applied to the segment electrodes included in the liquid crystal display panel 2. As is well known, the liquid crystal material is sandwiched between the counter electrodes and the segment electrodes in the liquid crystal display panel 2. In this way, the liquid crystal material is activated at the duty 1/10. Since the numeral display in the liquid crystal display panel is well known in the art, the drive control related to the numeral display section 3 is omitted for the purpose of simplicity.

TABLE II

| input to segment decoder | output from segment decoder -32- |
|---|---|
| 5 4 3 2 1 | 29 28 27 — — — — 4 3 2 1 |
| 0 0 0 0 0 | 0 0 0           0 0 0 0 |
| 0 0 0 0 1 | 0 0 0           0 0 0 1 |
| 0 0 0 1 0 | 0 0 0           0 0 1 1 |
| 0 0 0 1 1 | 0 0 0           0 1 1 1 |
| ⋮ | ⋮ |
| 1 1 0 1 1 | 0 0 1           1 1 1 1 |
| 1 1 1 0 0 | 0 1 1 — — — — 1 1 1 1 |
| 1 1 1 0 1 | 1 1 1           1 1 1 1 |

In the foregoing embodiment, when the display key 7 is actuated, the body temperature of the present day is displayed at the numeral display section 3 in addition to the graphic display of the ten day variation. In another embodiment of the present invention, the numeral display of the present day temperature can be omitted for simplifying the system.

In a further embodiment of the present invention, the graphic display and the numeral display can be conducted on a same display panel of the dot matrix type. In this embodiment, the graphic display and the numeral display are alternatively achieved in order to reduce the required number of the segment electrodes and the display registers.

FIG. 8 is a flow chart for explaining the embodiment, wherein the graphic display and the numeral display are alternatively conducted. The operation steps shown in FIG. 8 can be substituted for the steps n13 through n17 shown in FIG. 5. A step p29 performs the bar graph display without the numeral display. At the following step p30, a condition is detected where the operator releases the display key 7. The bar graph display is conducted for ten (10) seconds after the operator releases the display key 7. The steps p31, p33, p34 and p35 perform the same operations as conducted at the steps n14, n15, n16 and n17 of FIG. 5, respectively. If the display key 7 is actuated again during the ten second bar graph display period, the program is advanced from a step p32 to a step p36 at which the graphic display of the ten day variation is cleared. Then, the program is advanced to the following step p37 for displaying the numeral value of the present day temperature on the dot matrix display panel. The numeral display is also conducted for ten (10) seconds through the use of the same loop including the steps p31, p33, p34 and p35. Since the actuation of the display key 7 is detected at the step p32, the release operation of the display key 7 is detected at the step p30 in order to ensure an accurate operation. Therefore, in the embodiment of FIG. 8, the bar graph display is first conducted, and the numeral display is conducted on the same display panel in accordance with the steps p36 and p37 when the display key 7 is actuated while the bar graph display is conducted.

In a modified example of the present invention, the measurement start key 5, the memory key 6 and the display key 7 can be incorporated into a single key. In this example, the first actuation of the single key can be considered as the actuation of the measurement start key 5. When the single key is actuated during the measuring period, this actuation should be considered as the actuation of the memory key 6. And, the next actuation of the single key is considered as the actuation of the display key 7.

As is well known, the measuring operation of the basal body temperature should be conducted once a day at a preselected time. In case the memory key 6 is actuated twice a day or is not actuated in a day, an accurate temperature variation curve can not be obtained because the memorized temperature values do not correspond to each day. However, there is a possibility that the measuring operation can not be conducted due to some reason. It is required to obtain the temperature variation curve even though the measuring operation was not conducted at a specific day. Moreover, if the measuring operation is conducted twice a day, one of the temperature data should be treated as the actual data.

To achieve the above-mentioned operation, in still another embodiment of the present invention, a timepiece function is added to the electronic thermometer, whereby the body temperature measured at a preselected period of time is treated as the basal body temperature. If the measuring operation is conducted twice in the preselected period of time, the first temperature data is treated as the basal body temperature, and the second data is neglected. If the measuring operation is not conducted in the preselected period of time, the system memorizes that the measuring operation has not been conducted on the corresponding day. The above-mentioned preselected period of time can be selected at a desired period, for example, starting from 0:00 a.m. and ending at 0:00 a.m. of the next day. If required, the system is constructed to set the preselected period of time at the operator's choice through the use of a key input system.

FIG. 9 shows an example of the operation wherein the preselected period of time is selected at a period starting from 0:00 a.m. and ending at 0:00 a.m. of the next day. In this embodiment, a time key 8 (shown by the broken line in FIG. 2) is provided for setting the current time information. Further, a time setting and time keeping subroutine shown in FIG. 10 is added to the one chip microcomputer 11. The remaining constructions are similar to that shown in FIGS. 2 through 7.

When the main power switch 13 is switched on, at a step q61, the random access memory in the one chip microcomputer 11 is cleared, the display on the liquid crystal display panel 2 is cleared, and the time information stored in the random access memory is forced to become 0:00 a.m. The one chip microcomputer 11 includes a second counter S which counts from zero seconds to 3,600 seconds, and an hour counter H which counts from zero to twenty-three (23). When none of the display key 7, the measurement start key 5 and the time key 8 are actuated, the program is advanced to a timepiece subroutine q65 through steps q62, q63 and q64.

FIG. 10 shows the timepiece subroutine. At a step r89 in the timepiece subroutine q65, a determination is conducted as to whether a one second clock signal is developed. At a step r90, the contents stored in the second counter S are increased by one when the one second clock signal is developed. When the contents stored in the second counter S reach "3,600", the program is advanced from a step r91 to a step r92 wherein the second counter S is cleared to zero and the contents stored in the hour counter H are increased by one. When the contents stored in the hour counter H reach twenty-four (24), the program is advanced from a step r93 to a step r94 at which the hour counter H is cleared. The timepiece subroutine includes a step r95 to switch off the generation of the one second clock signal.

Then, the program is returned from the timepiece subroutine to a step q66 in the mainroutine shown in FIG. 9. At the step q66, a determination as to whether it is now 0:00 a.m. is conducted. When it is 0:00 a.m., the program is advanced to the following step q67. At 0:00 a.m. the contents stored in the second counter S and the hour counter H are zero. At the step q67, the temperature data of eight days ago which is stored at the memory section M8 in the random access memory is transferred to the memory section M9 which is assigned to store the temperature data of nine days ago. In a same manner, the temperature data is shifted. The temperature data stored in the memory section M0 is transferred to the memory section M1, and the memory section M0 is cleared. That is, the step q67 functions to shift the memorized temperature data in the random access memory at 0:00 a.m. Unless the step q67 occurs in response to the step q66, any actuation of the memory key 6 is neglected.

When the actuation of the time key 8 is detected at the step q64, the program is advanced to a step q68 at which the second counter S is cleared. At the following step q69, the contents stored in the hour counter H is displayed on the liquid crystal display panel 2. If the continuous actuation of the time key 8 is detected at a step q72 and the set state of a flip-flop 41 (which will be described later with reference to FIG. 11) is detected at a step q70, the contents stored in the hour counter H is increased by one upon every one second. The increment operation is conducted at a step q71. When the release of the time key 8 is detected at the step q72, the program is advanced to the following step q73 at which the display on the liquid crystal display panel 2 is cleared, and the program is returned to the step q62.

In the embodiment of FIG. 9, only one time key 8 is required to adjust the real time. However, the time adjusting operation must be conducted at zero minutes of any o'clock if the time information is required to be adjusted even at the minute information.

When the actuation of the measurement start key 5 is detected at the step q63, the timer T is cleared at a step q74 and the value 35.00 is introduced into a memory section of the random access memory for setting the initial temperture to 35.00° C. When one second has passed, the program is advanced from a step q75 to a step q78 at which the timepiece subroutine shown in FIG. 10 is conducted, and the contents stored in the timer T are increased by one. If the contents stored in the timer T do not reach "600", that is, when ten (10) minutes have not passed from the initiation of the measuring operation, the program is advanced from a step q79 to the following step q80 at which the body temperature data is monitored. If the now measured body temperature is higher than the contents (maximum value) stored in the memory section in the random access memroy, the program is advanced from a step q81 to the following step q82 to update the body temperature data.

When ten (10) minutes have passed from the initiation of the measuring operation, the condition is detected at the step q79 for terminating the temperature measuring operation. When the memory key 6 is actuated during the measuring period, the actuation is detected at a step q76 and the program is advanced to the following step q77. At the step q77, the maximum value stored in the random access memory is transferred to the memory section M0 which is assigned to store the temperature data of the present day.

When the actuation of the display key 7 is detected at the step q62, the program is advanced to the graphic display subroutine q83 at which the ten day temperature variation is displayed in the bar graph fashion in a same manner as described in FIG. 6. The steps q84, q85, q86 and q87 are provided for conducting the graphic display for ten (10) seconds.

Figure 11:
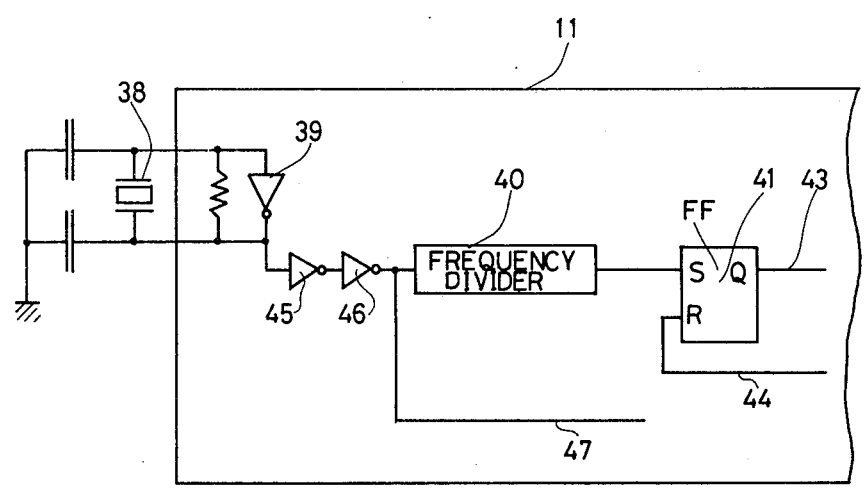
FIG. 11 is a schematic block diagram of an essential part of a microcomputer included in the electronic thermometer of the embodiment of FIG. 9.

FIG. 11 shows an essential part of the one chip microcomputer 11 related to the embodiment of FIGS. 9 and 10. A crystal oscillator 38 is included in the electronic thermometer, which is connected to an inverter 39 included in the one chip microcomputer 11 for developing a base frequency signal of the frequency of 32.768 KHz. The oscillation output signal is applied to a waveform shaping circuit comprising inverters 45 and 46. The shaped output signal is developed via a line 47 as the clock signal. The shaped output signal is also applied to a frequency divider 40 which includes a series connection of fifteen (15) flip-flops to divide the signal into $2^{15}$. That is, the output signal derived from the frequency divider 40 is the one hertz signal, which is applied to the above-mentioned flip-flop 41. Thus, the flip-flop 41 receives the clock signal once one second. The set output line 43 of the flip-flop 41 is applied to the control logic for controlling the above-mentioned operation of FIGS. 9 and 10. Further, the control logic develops a reset signal for resetting the flip-flop 41 via a line 44.

The above-mentioned embodiment of the electronic thermometer of the present invention includes the timepiece function. Therefore, the time key 8 is required, and the operation in the one chip microcomputer 11 becomes complicated. To prevent these problems, a timer system can be incorporated into the electronic thermometer instead of the timepiece system. In this timer controlled system, when the first measuring operation is conducted after the switching of the main power switch 13, the next measuring operation is expected to be conducted at a time about twenty-four (24) hours (86,400 seconds) later. Four (4) hours difference is provided before and after the next expected time to obtain a time range. If the temperature measuring operation of the next day is conducted within the above-mentioned time range, the system functions to store the temperature value as the basal body temperature data. A temperature value measured before the time range is not memorized in the system. If the temperature measuring operation is not conducted within the time range, the system determines that the temperature measuring operation has not been conducted today. In such a system, the counters of radix 60 and 24 are not required. One day period is calculated by counting a one second signal by 86,400 times. That is, the above-mentioned time range starts from 72,000 seconds and ends at 100,800 seconds counted from the last measuring operation. When the next measuring operation is conducted, the contents stored in the timer are cleared, and the next time counting operation is started. If the temperature measuring operation is not conducted within the time range, the contents stored in the timer counter are forced to change from 100,800 seconds to 14,400 seconds. Thus, the next time range corresponds to that of the normally counted time range between 72,000 seconds and 100,800 seconds. That is, the time range is selected around a time 48 hours later than the measuring operation of two days ago.

The segment number required in the graphic display section 4 can be reduced without deteriorating the display quality. A first method is to display the body temperature with the unit of 0.1° C. instead of the unit of 0.05° C. Generally, the basal body temperature has the difference about 0.5° C. between the low phase and the high phase and, therefore, this method will not make the observation difficult.

A second method is to shift the temperature range to be displayed on the graphic display section 4 of the liquid crystal display panel 2. As already discussed above, the temperature difference in a menstruation cycle is normally about 0.5° C. More specifically one woman may have the temperature variation between 36.00° C. and 36.50° C. Another woman. may have the temperature variation between 36.50° C. and 37.00° C. In one example, the segment number assigned to one day is reduced to eight (8), and the temperature is displayed with the interval of 0.1° C., whereby the graphic display covers the temperature data having the difference of 0.7° C.

To achieve the second method, the microcomputer 11 must determine a desired zone to which the largest number of temperature data belong under the condition where the temperature zone of 0.7° C. is progressively shifted in a manner, for example, 35.80–36.50; 35.90–36.60; 36.00–36.70; . . . ; 36.50–37.20. If the temperature range of 36.20 through 36.90 is selected as the desired zone, the temperature data 36.20° C. is displayed by enabling only one segment, and the temperature data 36.90° C. is displayed by enabling eight (8) display segments. If the temperature data is less than the desired zone, that is, less than 36.20° C., only one segment is enabled. If the temperature data is above the desired zone, that is, greater than 36.90° C., eight (8) segments are enabled. Such a rounding will not produce an erroneous observation.

Figure 12A:
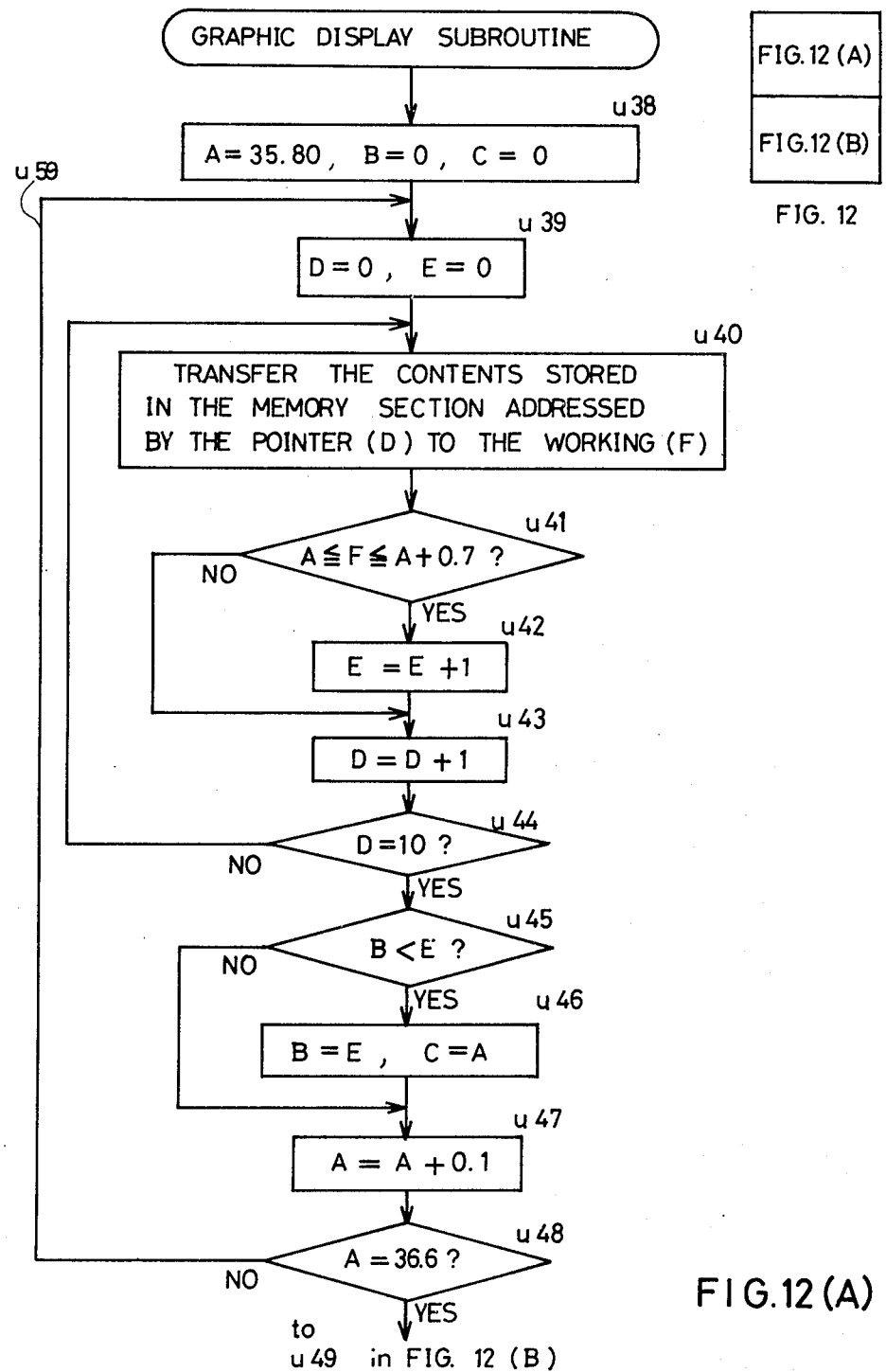

FIG. 12 shows a flow chart of a graphic display subroutine for conducting the above-mentioned second method. The mainroutine associated with the subroutine of FIG. 12 is similar to that shown in FIG. 5. However, in the embodiment of FIG. 5, the temperature data is memorized with the unit of 0.05° C. In the embodiment of FIG. 12, the temperature memory must be conducted with the unit of 0.1° C. In FIG. 12, A through G represent memory sections in the random access memory included in the one chip microcomputer 11. The loop u59 is to search the above-mentioned desired zone. That is, the temperature range is shifted in a manner that 35.8° C.–36.5° C., 35.9° C.–36.6° C., . . . , 36.5° C.–37.2° C., and the desired zone is searched so that the largest number of data of ten (10) days belong to the desired zone. The loop u60 is to control the graphic display in the desired zone determined by the loop u59.

The operation of the graphic display control of FIG. 12 is as follows. First, at the step u38, the minimum value 35.80 is set at the memory section A. The memory section B is to count the number of day of which the temperature data belongs to the desired zone, and the memory section C is to store the lowest temperature in the desired zone. At the step u38, the contents stored in the memory sections B and C are reset to zero. The memory section D is the pointer for addressing the memory sections in the random access memory which store the temperature data of ten (10) days. The memory section E is to count the number of days in which the temperature data belongs to a temperature range determined by the lowest temperature stored in the memory section C. At the step u39, the contents stored in the memory sections D and E are reset to zero. At the following step u40, the temperature data stored in the memory sections (M0 through M9) addressed by the pointer section D is transferred to the working register F. The following step u41 is to determine whether the temperature data in the working register F belongs to the temperature range between the value stored in the memory section A and the value A+0.7° C. If the temperature data in the working register F belongs to the above-mentioned temperature range, the contents stored in the memory section E is increased by one at the following step u42. If the temperature data temporarily stored in the working register F does not belongs to the now selected temperature range, the step u42 is skipped. Then, at the following step u43, the contents stored in the pointer D is increased by one. The above-mentioned checking operation is repeated till the contents stored in the pointer D reach ten (10). When the contents stored in the pointer D reach ten (10), the program is advanced to the following step u45. At this moment, the contents stored in the memory section E represent the number of days in which the temperature data belongs to the temperature range determined by the lowest value stored in the memory section A. In case the contents stored in the memory section E are greater than the contents stored in the memory section B, the program is advanced from the step u45 to the following step u46 to update the contents in the memory sections B and C. More specifically, the contents stored in the memory section E are transferred to the memory section B, and the contents stored in the memory section A are transferred to the memory section C. In case the contents stored in the memory section E are not greater than the contents stored in the memory section B, the contents stored in the memory sections B and C are not changed. At the step u47, the temperature value stored in the memory section A is increased by 0.1° C. If the increased temperature value does not reach 36.6° C., the program is returned from the step u48 to the step u39 through the loop u59. At a time when the contents stored in the memory section A reach 36.6° C., the contents stored in the memory section C represent the lowest temperature of the desired zone to which the largest number of days belong.

The pointer D is cleared to zero at the step u49. At the following step u50, the temperature data stored in the memory sections (M0 through M9) addressed by the pointer D is transferred to the working register G. A calculation, $(G-C)\div 0.1+1$, is conducted at the following step u51, and the calculation result is checked at the following step u52. When the calculation result G is "1", "2", "3", "4", "5", "6", "7" or "8", the calculation result G is directly applied to the following step u55. If the calculation result is less than "1", the step u53 is conducted to set the result G to "1". If the calculation result G is greater than "8", the step u54 is conducted to set the calculation result G to "8". The remaining steps u56, u57 and u58 perform the same functions as that achieved by the steps m25, m26 and m27 shown in FIG. 6, respectively. However, in the embodiment of FIG. 12, the bar graph display data is from "1" to "8". Therefore, the display registers 20 through 29 in FIG. 7 can be the four (4) bit register, and the output lines from the segment decoder 31 are required only by eight (8). Another way to reduce the segment number for achieving the bar graph display is to reduce the number of days which is displayed at a same time. In a preferred form, the scroll type display are conducted to observe a ten (10) day variation. The most important data which should be observed is the turning day from the low phase to the high phase. It will be clear from the typical basal body temperature curve shown in FIG. 1 that a glance of five (5) day variation will provide sufficient data. Thus, it will be sufficient that only five (5) columns are provided for displaying the temperature variation. In this example, when the display key is actuated, the temperature of the present day to the temperature of four days ago are graphically diplayed. When the display key is again actuated or continuously actuated, the graphic display is shifted right to erase the display related to the present day temperature and add the display related to the temperature of five (5) days ago.

There is a possibility that the temperature value is desired to be checked in addition to the bar graph display. In a further embodiment of the present invention, the memorized temperature data is displayed on the numeral display section 3 of the liquid crystal display panel 2. As already discussed above, the temperature data of the present day is numerically displayed on the numeral display section 3 in addition to the bar graph display when the display key is actuated. In the further embodiment of the present invention, the present day column is driven to flicker to indicate that the displayed numeral data is the temperature of the present day. Under these conditions when the display key is again actuated, the temperature data of yesterday is numerically displayed and the column assigned to yesterday in the bar graph display is driven to flicker. In this way, the memorized temperature value is displayed on the numeral display section 3 of the liquid crystal display panel 2.

In a still further embodiment of the present invention, a time period counted from the initiation of the measuring operation is informed through the use of buzzer sounds. Normally, the measuring operation of the basal body temperature must be conducted for five (5) minutes.

If the measuring operation is terminated by three (3) minutes, the obtained temperature variation curve includes more noises. Thus, it is preferable to develop some signs to indicate a time period counted from the initiation of the measuring operation. One of the following buzzer sounds may well inform the operator of the time period counted from the initiation of the measuring operation.

(a) The buzzer is activated upon every counting of one minute. In this case, the operator must count the activation of the buzzer in order to know the period counted from the initiation of the measuring operation.

(b) The buzzer is activated once when one minute has passed. The buzzer is activated twice when two minutes have passed.

(c) The characteristic of the buzzer sounds is changed depending on the time period. For example, the buzzer sound of [pi] is developed when one minute has passed. The buzzer sound of [pi,pi] is developed when two minutes have passed. The buzzer sound of [pi :] is developed when three minutes have passed. The buzzer sound [pi : pi] is developed when four minutes have passed. And, the buzzer sound of [pi : pi :] is developed when five minutes have passed from the initiation of the measuring operation.

(d) The buzzer activation is conducted only at preselected times, for example, at two minutes and at five minutes, respectively. It is preferable that the buzzer sound activation is different at the two minutes and five minutes.

FIG. 13 shows a flow chart for conducting the above-mentioned method (d). At a time when two (2) minutes have passed from the initiation of the measuring operation, one buzzer sound is developed. At a time when five (5) minutes have passed from the initiation of the measuring operation, two buzzer sounds are developed.

In FIG. 13, steps w74 through w82 and w88 correspond to the steps q74 through q82 and q88 in FIG. 9, respectively. At the step w78, the real time data is updated. When two (2) minutes have passed from the initiation of the measuring operation, the program is advanced from the step w100 to a step w102 which functions to activate the buzzer for 250 milliseconds. When five (5) minutes have passed from the initiation of the measuring operation, the program is advanced from the step w101 to a step w103 which functions to develop the buzzer sound for 250 milliseconds and again develop the buzzer sound for 250 milliseconds with the interval of 250 milliseconds. When the buzzer activation is conducted, the program is returned to the step w75 without conducting the temperature measuring operation of the steps w80, w81 and w82.

FIG. 14 shows a buzzer drive circuit and a buzzer drive logic included in the one chip microcomputer 11. The contents stored in the accumulator included in the one chip microcomputer 11 are applied to the data input terminal of a flip-flop 52 through a signal line 50. The instructions developed by the one chip microcomputer 11 are decoded by the instruction decoder and, then, a pulse signal is developed at a signal line 51 when the instruction is the command to activate the buzzer. The signal line 51 is connected to the clock terminal of the flip-flop 52, whereby the contents stored in the accumulator are latched at the flip-flop 52 when the buzzer activation command is developed. A signal line 56 is to introduce a frequency signal of 4 KHz which is obtained from the frequency divider 40 of FIG. 11. An output signal line 58 of a NAND gate 57 transfers the frequency signal of 4 KHz when the logic "1" is latched at the flip-flop 52. The thus developed frequency signal activates a buzzer 54.

A transistor 53 is switched on when the output signal line 58 bears the high level, thereby activating the buzzer 54 at 4 KHz.

Although in the foregoing embodiments the temperature sensor unit is incorporated in the electronic thermometer body, the temperature sensor unit can be separately formed and connected to the electronic thermometer body via a signal wire.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic thermometer comprising:
   temperature sensing means for detecting the body temperature and developing a data signal representing the body temperature;
   memory means for storing a said data signal for each of at least five days;
   graphic display means for displaying body temperature variations in accordance with said data signals stored in said memory means;
   control means for interconnecting said temperature sensing means, said memory means and said graphic display means;
   measurement start key means in said control means said detecting operation of the body temperature through the use of said temperature sensing means;
   memory key means in said control means for instructing a memorizing operation of said data signal into said memory means;
   display key means in said control means for activating said graphic display means to display a temperature corresponding to said data signal;
   time period counting means in said control means responsive to actuation of said measurement start key means for counting a time period starting from such actuation;
   said control means disabling said temperature sensing means when the time period counted by said time period counting means reaches a predetermined value; and
   interruption means responsive to said memory key means and said time period counting means for disabling said temperature sensing means when said memory key means is actuated before said predetermined value is counted by said time period counting means;
   said memory means comprising:
   a first memory section for storing the data signal which represents the body temperature of the present day;
   a second memory section for storing the data signal which represents the body temperature of one day ago;
   a third memory section for storing the data signal which represents the body temperature of two days ago;
   a fourth memory section for storing the data signal which represents the body temperature of three days ago; and
   a fifth memory section for storing the data signal which represents the body temperature of four days ago.

2. The electronic thermometer of claim 1, wherein said graphic display means comprises a liquid crystal display panel including at least five columns for displaying said temperature variation in a bar graph fashion.

3. The electronic thermometer of claim 1 or 2, wherein said liquid crystal display panel further displays a temperature value currently detected by said temperature sensing means.

4. The electronic thermometer of claim 1 or 2 further comprising:
   time zone setting means for determining a preselected zone of time in a day;
   determination means for detecting whether the detecting operation of the body temperature is conducted in said preselected zone of time and developing a detection output when the detecting operation of the body temperature is conducted in said preselected zone of time; and
   neglecting means for neglecting an actuation of said memory key means when said memory key means is actuated under the condition where said detection output is not developed from said determination means.

5. The electronic thermometer of claim 1 or 2 further comprising:
   time zone setting means for determining a preselected zone of time in a day;
   determination means for detecting whether the detecting operation of the body temperature is conducted in said preselected zone of time and developing a detection output when the detecting operation of the body temperature is conducted in said preselected zone of time;
   neglecting means for neglecting an actuation of said memory key means when said memory key means is actuated under the condition where said detection output is not developed from said determination means; and
   wherein said liquid crystal display panel further displays a temperature value currently detected by said temperature sensing means.

* * * * *